United States Patent [19]

Shimazaki

[11] 3,963,334

[45] June 15, 1976

[54] FILM TRANSPORT APPARATUS FOR A MOTION PICTURE CAMERA OR PROJECTOR

[75] Inventor: Mamoru Shimazaki, Tokyo, Japan

[73] Assignee: Canon Kabushiki Kaisha, Tokyo, Japan

[22] Filed: Nov. 20, 1974

[21] Appl. No.: 525,628

[30] Foreign Application Priority Data

Nov. 27, 1973 Japan.............................. 48-137217
Dec. 21, 1973 Japan.................................... 49-796

[52] U.S. Cl. .............................................. 352/191
[51] Int. Cl.² ........................................... G03B 1/22
[58] Field of Search ........... 352/191, 192, 193, 194, 352/195, 196, 224

[56] References Cited
UNITED STATES PATENTS

| | | | |
|---|---|---|---|
| 3,094,055 | 6/1963 | Elsas .............................. | 352/195 X |
| 3,250,586 | 5/1966 | Winkler ............................ | 352/224 |
| 3,439,980 | 4/1969 | Teshi ............................. | 352/224 X |

FOREIGN PATENTS OR APPLICATIONS 400,762  4/1966  Switzerland........................ 352/191

*Primary Examiner*—Monroe H. Hayes
*Attorney, Agent, or Firm*—Toren, McGeady and Stanger

[57] ABSTRACT

A film transport apparatus for a motion picture camera or a motion picture projector comprises a film gate mechanism, a film advancing mechanism for intermittently advancing the film past the exposure or projection aperture, and a takeup reel drive mechanism which permits the takeup reel to wind up the advanced film after it leaves the aperture during the time when the film advancing mechanism is advancing the film and which is arrested to prevent the takeup reel from winding up the film during the time when the intermittently moving film is stopped.

From another aspect of the disclosure, the film gate mechanism comprises an aperture plate provided with first and second film alignment abutments fixedly mounted thereon and arranged on one side of the film path in symmetrically spaced relation to the aperture, and with first and second resilient biased film abutments movably mounted thereon and arranged on the opposite side of the film path in symmetrically spaced relation to the aperture to urge the film against the first and second fixed film abutments respectively. In this film channel construction, the points at which the first and second fixed abutments exert friction against that portion of the film which passes the aperture are out of transversal alignment with those at which the first and second movable abutments exert friction against the film portion, whereby the film in the film gate is stabilized against residual intermittent and irregular motions by such an arrangement of the film abutments with a force larger than the force of the advanced film despite of the fact that vibrations and shocks develop in the region of the takeup reel.

9 Claims, 9 Drawing Figures

FILM TRANSPORT APPARATUS FOR A MOTION PICTURE CAMERA OR PROJECTOR

BACKGROUND OF THE INVENTION

1. Field of the Invention

This invention relates to motion picture cameras and motion picture projectors in general, and more particularly to film transport apparatus permitting for the motion picture cameras and motion picture projectors provided therewith to use film magazine without imparting residual intermittent and irregular motions to the film as it is intermittently advanced past the film gate and during the time when the intermittently advancing film is stopped. Still more particularly, the invention relates to improvements in the construction of a film channel in the film gate.

2. Description of the Prior Art

Conventional film transport apparatus for motion picture cameras and motion picture projectors may be classified into two main types with respect to the film reel system: the apparatus which transports the film from a supply open reel to a take-up open reel after it is intermittently advanced past the film gate: and the other the apparatus which intermittently transports the film from a supply reel to a take-up reel enclosed in a film magazine. The apparatus of the former type usually employs an intermittent-drive film pull-down claw in combination with a pair of sprockets arranged as intervening the pull-down claw to continuously pull and supply from and to the reel and to form slack loops of so appropriate lengths on both sides of the pull-down claw between the sprockets that allowance is made for the differences in the instantaneous velocities of the film as it passes through these advancing means. So long as the appropriate film length of each of the slack loops is secured, therefore, there is almost no occasion for the film frame in the film gate to undergo flutter or missing.

On the other hand, the apparatus of the latter type cooperating with a film magazine is provided with no sprocket assembly because of the space limitation in making compact the structure of the film magazine. Any type of commercially available film magazine for use in the motion picture cameras of the hand held type is formed mainly with a film guide assembly and supply and take-up reels within a housing. In this case, that portion of the film which is advanced by the intermittent-drive pull-down claw past the film gate is directly wound onto the take-up reel as it is driven for rotation by a take-up reel drive, thereby the intervening film between the film gate and the take-up reel does not sag into a controlled buffer loop so that when the tension exerted on the intervening film by the take-up reel drive varies irregularly, or when it becomes too strong, residual intermittent and irregular motions are imparted into the film during the time when it is advanced past the film gate as well as during the time when the intermittently advancing film is stopped. Such a problem also becomes serious in the open-reel operation when no sprocket assembly is employed.

SUMMARY OF THE INVENTION

An object of the present invention is to provide a motion picture camera or a motion picture projector which has overcome the above mentioned conventional drawback.

Another object of the present invention is to provide an improved film transport apparatus for such a camera or projector. The film transport apparatus is constructed in such a way that the motion of the intermittent-drive film advancing means is transmitted to the take-up reel drive means during the interval when the film is intermittently advanced past the film gate, while it is not transmitted thereto during the interval when the intermittently advancing film is stopped, whereby the film in the film gate is stabilized against the residual intermittent and irregular motions as it is transported from a supply reel to a take-up reel.

Still another object of the present invention is to provide a film gate of novel construction adapted for association with such a film transport apparatus and for cooperation with that portion of the film in the film magazine which passes the window provided through the front wall of the film magazine. The film gate is provided with resilient biased means arranged along the film channel to exert friction to the film with a force larger than that of the advanced film, whereby the film in the film gate is stabilized against the residual intermittent and irregular motions as it is transported from a supply reel to a take-up reel.

Other objects and features of the present invention will become apparent from the following detailed description taken in conjunction with the accompanying drawings.

DESCRIPTION OF THE PREFERRED EMBODIMENTS

The present invention will be explained with reference to motion picture cameras although it is understood that the present invention techniques are equally applicable to motion picture projectors. At first, for a better understanding of the invention, prior art film transport apparatus will be described by reference to FIGS. 1 through 4.

Figure 1:
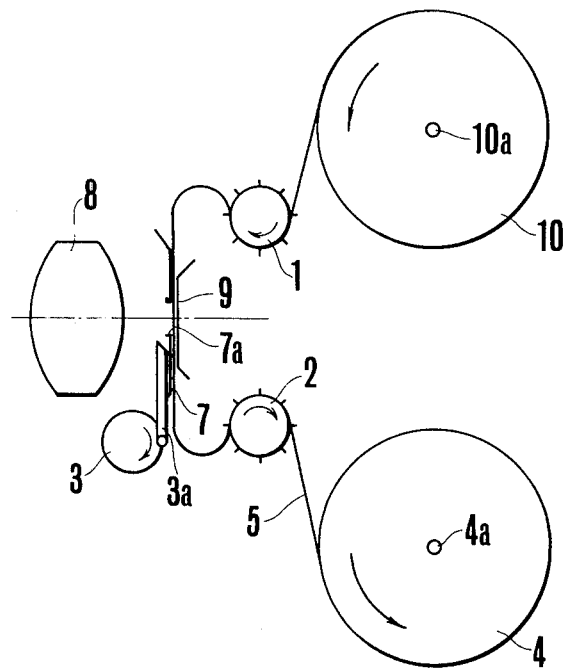
FIG. 1 is a fragmentary schematic illustration of a motion picture camera of open reel type which employs a prior art film transport apparatus.

FIG. 1 schematically shows the essential components of a film transport apparatus for the reel-to-reel system in which a pair of open reels are employed. A film 5 is transported from a supply reel 10 to a take-up reel 4 by means of sprockets 1 and 2 engaging the film sprocket holes, the reels 10 and 4 being removably mounted on respective live reel spindles 10a and 4a for rotation therewith as a unit in directions indicated by arrows. The film is being pulled from supply reel 10 at a constant speed by the first sprocket 1. The motion of the film is converted to intermittent motion by an intermittent-drive film advancing mechanism 3 as it passes a film gate 7. After it leaves the film gate 7, the intermittent motion of the film is converted to a constant speed by the second sprocket 2. Slack loops are formed on both sides of the film gate 7 between the first and second sprockets 1 and 2 to make allowance for the differences in the instantaneous velocities of the film as it passes through these several points of the system.

The film gate 7 has an opening or exposure aperture 7a which is located in front of a pressing plate 9 which urges the film toward the film gate 7, and which is aligned with an optical axis of a camera objective lens 8. The intermittent-drive film advancing mechanism comprises a pull-down claw 3a which engages the film adjacent the exposure aperture 7a and intermittently advances the film along a film passage defined by the film gate 7 and the pressing plate 9. In order to exert an appropriate tension on the portion of the film 5 between the second sprocket 2 and the take-up reel 4, there is provided a slip friction clutch not shown arranged between the take-up reel sprindle 4a and take-up reel drive means not shown, to permit the take-up reel drive means to rotate at a speed faster than the speed of the sprocket 2. The slack loop between the film gate 7 and the second sprocket 2 can not be affected by this tension, thus stabilizing the transpsort of the film through the film channel behind the exposure aperture.

Figure 2:
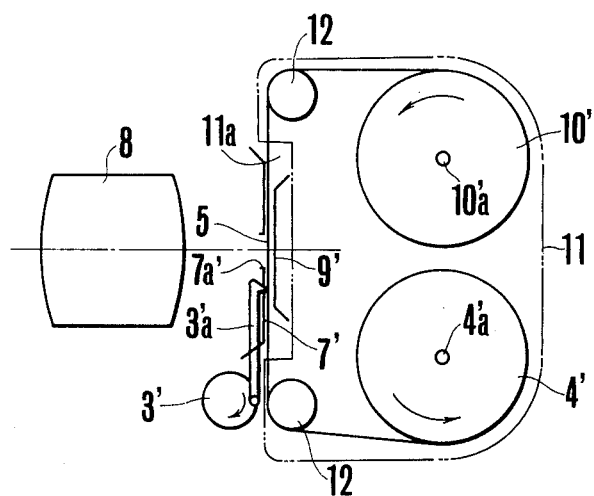
FIG. 2 is a fragmentary schematic illustration of a motion picture camera of Single 8 cartridge type which employs a prior art film transport apparatus.

FIG. 2 schematically shows the essential components of a film transport apparatus cooperating with a Single 8 film cartridge or magazine that is indicated at 11. The film magazine 11 accomodates a film supply spool or reel 10' and a film take-up spool or reel 4'. The two reels are coplanarly mounted in a section of the magazine for rotation about parallel axes 10a', and 4a'. Passing from the supply reel 10' to the take-up reel 4', the film sequentially travels around film guides or rollers 12 positioned in opposite corners of the magazine 11 on the same side of the supply and take-up reels. On the other hand, the camera housing itself is provided with a film gate 7' having an opening 7a which registers with the window of the magazine 11 when it is properly inserted into the magazine chamber defined in the camera housing and which lifts the film 5 off the window so that the film frame which is located directly behind the exposure aperture 7a' is controlled in position while being biased by the pressing plate 9' against the film channel. An intermittent-drive film advancing mechanism 3' including pull-down claw 3a' is provided in the camera side.

Figure 3:
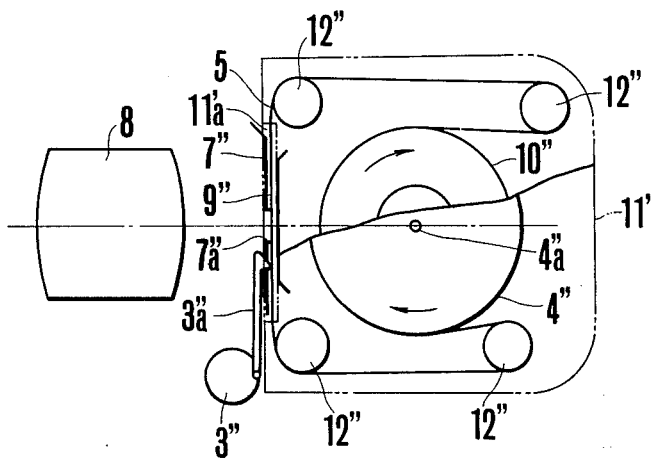
FIG. 3 is a fragmentary schematic illustration of a motion picture camera of Super 8 cartridge type which employs a prior art film transport apparatus.

FIG. 3 schematically shows the essential components of a film transport apparatus cooperating with a Super 8 film cartridge or magazine. The film magazine 11' accommodates a film supply reel 10" and a film take-up reel 4" mounted on a common shaft 4a'. Coming from the supply reel 10", the film 5 is caused to travel around a pair of film guide rollers 12", along the inner side of a window while being pressed against this window by a pressing plate 9" and around a pair of film guide rollers 12" to a take-up reel 4". An intermittent-drive film advancing mechanism 3" including a pull-down 3a" is provided in the camera housing.

Figure 4:
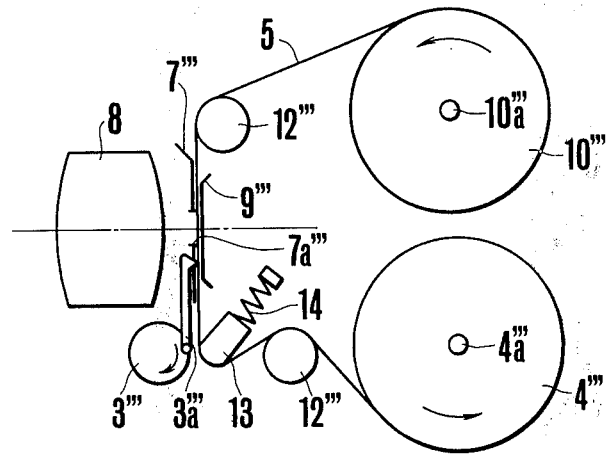
FIG. 4 is a fragmentary schematic illustration of a motion picture camera of modified open reel type which employs a prior art film transport apparatus.

FIG. 4 schematically shows the essential components of a film transport apparatus of FIG. 1 with a slight modification wherein the sprockets 1 and 2 of FIG. 1 are omitted for the purpose of reducing the production cost but instread use is made of guide rollers 12''' in combination with a loop former comprising a convex body 13 connected to the camera housing through a helical expansion spring 14. Likewise as in the apparatus of FIG. 1, there is provided a slip friction clutch (not shown) arranged between the take-up reel spindle 4a''' and the take-up reel drive (not shown) to exert a tension in the portion of the film 5 between the film gate 7''' and the take-up reel 4'''. However, the loop formed by the film 5 along the convex outer side of the loop former 13, 14 can be lengthened or shortened by a decrease or increase in torque of the take-up reel drive so as to prevent unwanted force from being applied to the film in the region of the film gate 7''' when it is intermittently advanced by the pull-down claw 3 a'''.

In the apparatus of FIGS. 2 and 3, no sprocket is used for the purposes of minimizing the complexity of structure of the film magazine or camera, and instead a number of guide rollers are used. Therefore, the film behind the exposure aperture is very susceptible to the force of the advanced film exerted by the friction clutch provided between the take-up reel spindle and the take-up reel drive. When this force exceeds the force under which the film is retained behind the exposure aperture, irregular and residual intermittent movement of the film frame are effected in the direction in which the excess force acts, resulting in excess advance of film frames or in super-position of the successive film frames, and otherwise impairing the quality of the reproduced images. This is true in the apparatus of FIG. 4, although the susceptibility is lessened to some extent.

For elimination of such a drawback, two attempts have been made by the present inventors, one of which is by decreasing the force of the advanced film by decreasing either the take-up drive friction or the take-up reel speed, and another attempt which is by increasing the friction of the film channel in the film gate. The former approach, however, is proven by experiment not to effect satisfactory results. As is known in the art, the film transport apparatus is designed to have as small a take-up drive friction as possible, and, therefore, a further decrease in the take-up drive friction causes an unsatisfactory winding operation of the take-up reel. Also the lower limit of the take-up reel speed depends upon the diameter of initial film core on the take-up reel, being in the range of from 94mm/sec. to 79mm/sec. for a presently widely accepted frequency of 18 frames/sec. Our experiment indicates that the decrease of the take-up reel to a level in this range does not produce a sufficient effect to eliminate the above mentioned drawback.

As is understood from the above, we have to turn to the latter approach. This approach is based on the application of a sufficient retention force on the portion of the film in the region of the film gate which is larger than the force exerted on the advanced film by the slip friction clutch and which is smaller than the force of the pull-down claw. Particularly in the case of the film magazine, minimization of the complexity of structure is important, and therefore it is preferred that the provision for exerting a retention force on the film in the region of the film gate is made in the camera rather than in the film magazine. The present invention contemplates the use of retention force exerting means as incorporated in a film gate shown in FIG. 7 in combination with a film transport apparatus as shown in FIG. 5 or 6.

Figure 5:
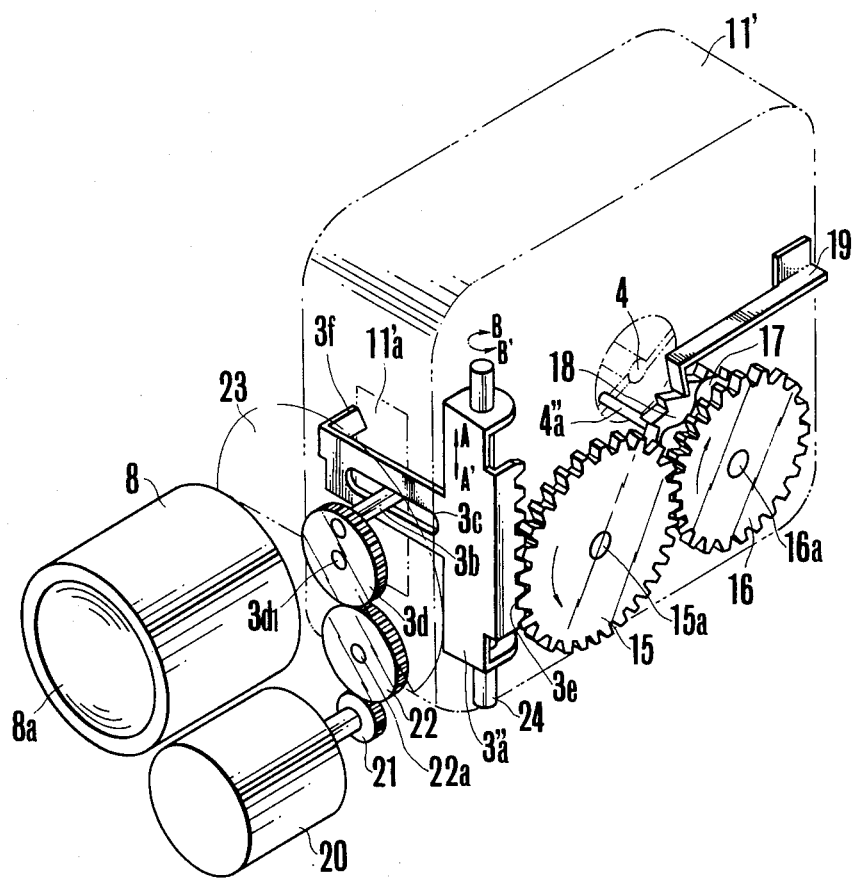
FIG. 5 is a fragmentary perspective view of a motion picture camera of Super 8 cartridge type which employs a film transport apparatus embodying one form of the invention.
Figure 6:
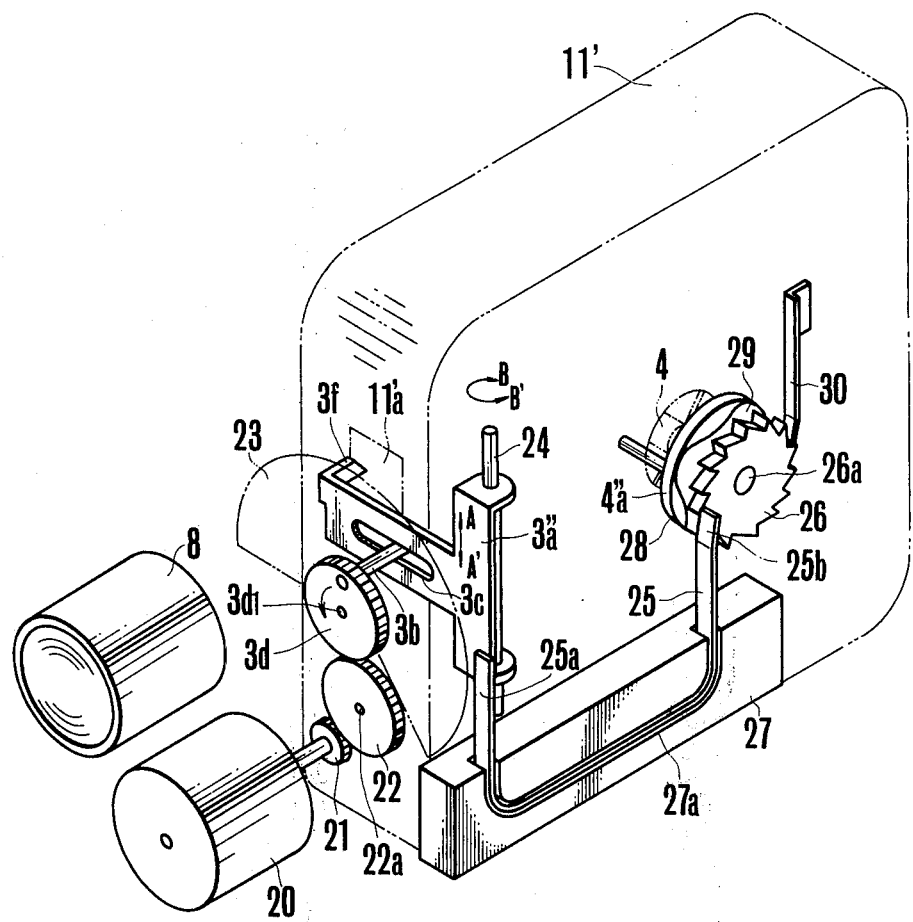
FIG. 6 is a fragmentary perspective view of a motion picture camera of Super 8 cartridge type which employs a film transport apparatus embodying another form of the invention.

Referring now to FIG. 5, there is shown one embodiment of a film transport apparatus in accordance with the present invention as incorporated in a motion picture camera. The camera comprises a housing not shown which accommodates a Super 8 film magazine 11' having a take-up reel 4 rotatable in a single direction to thereby collect advanced film by a pull-down mechanism 3, an objective lens 8a supported in a lens barrel 8, a disk-shaped shutter 23 arranged between the lens 8 and a film gate not shown to intermittently expose the window 11a' of the magazine 11' in response to rotation of the shaft $3d_1$ thereof, and a film transport apparatus including a motor 20 mounted in the housing. The operative connection between the shutter 23 and the motor 20 comprises a gear 3d which is fixedly mounted on the shaft $3d_1$ and engages an intermediate gear 22 mounted on a shaft 22a. The gear 22 is driven by a pinion 21 which is affixed to the output shaft of the motor 20. The shafts $3d_1$ and 22a are journalled in the housing. The gear 3d has an axially parallel projection or pin 3b extending rearwardly which cooperates with the pulldown mechanism 3. The film transport apparatus comprises the pull-down mechanism 3 capable of being driven by the motor 20, a take-up reel drive mechanism 18, and a power train connecting the motor 20 with the drive mechanism and including a friction clutch permitting operation of the motor 20 while the drive mechanism is held against rotation during the time when the pull-down mechanism is not advancing the film. The pull-down mechanism 3 comprises a control slide 3"a provided with an extension having a horizontally elongated slot 3c, as viewed in FIG. 5, in which the eccentric motion transmitting projection 3b is engaged. The control slide 3"a is guided for vertical movement by way of paired holes and a stationary shaft 24 which extends through the holes so as to cooperate therewith, and is also pivoted about the stationary shaft 24. The extension of control slide 3"a has at its free end a rectangularly rearwardly bent portion 3f serving as a claw arranged to engage the perforation holes of the film behind the window 11a when a film magazine 11' is properly inserted into the magazine chamber defined in the camera housing, and to normally move it downwardly always by the length of a frame at a frequency, for example, 18 frames per second. The slide 3"a is further provided with a toothed portion which forms a rack 3e engaging a gear 15 fixedly mounted on a shaft 15a which is journalled in the camera housing. The gear 15 engages a gear 16 fixedly mounted on a shaft 16a which is journalled in the camera housing. Coaxially and rotatably mounted on the shaft 16a is a ratchet wheel 18 cooperating with a reversal motion preventing pawl in the form of a spring 19 to permit clockwise rotation of the ratchet wheel 18 and fixedly carrying a rotary motion transmitting pin 4"a arranged to engage the take-up reel of a magazine which is properly inserted into the magazine chamber. The parts 18, 19 and 4"a together constitute a take-up reel drive mechanism. The ratchet wheel 18 can receive torque from the gear 16 by way of a conventional friction clutch 17. The parts 21, 22, 3, 15, 16 and 17 together constitute a power train between the output shaft of motor 20 and the motion transmitting pin 4"a.

The operation of the film transport apparatus of the construction described above in connection with FIG. 5 is as follows. When the motor 20 is rotated, the eccentric pin 3b is driven thereby through the gear train 21, 22 and 3d. As the eccentric pin 3b rotates, the motion of the eccentric pin 3b is transmitted to reciprocating movement of the slide 3"a in the direction indicated by arrow A–A' while the eccentric pin 3b engaging in the elongated slot 3c of the slide 3"a. At the same time, the slide 3"a is caused to cyclically pivot about the shaft 24 as indicated by arrow B–B' by a not shown mechanism known in the art. The trace of the claw 3f developed when the slide 3"a operates is identical to that of a conventional intermittent-drive film advancing means. As shown in FIG. 5, when the eccentric pin 3b has reached the upper dead point of the gear 3d, the slide 3"a is displaced to the uppermost position, and simultaneously is turned about the shaft 24 in a clockwise direction, causing the claw 3f to enter the window 11'a of the film magazine 11' and to engage a perforation hole of the film. Next, when the eccentric pin 3b is moved downwardly from the upper dead point to the lower dead point, the slide 3"a is moved to the downmost position, causing the claw 3f to advance the film by one frame forward in a ½ cyclic period while assuming the clockwisely pivoted position. When the eccentric pin 3b has reached the lower dead point, the slide 3"a is turned about the shaft 24 in a counter-clockwise direction to disengage the claw 3f from the perforation hole. After that, the slide 3"a is moved upward for the next ½ cyclic period during which the next film frame is held stationary for an exposure to light passing successively through the objective lens 8, an exposure aperture provided in the film gate not shown and the window 11'a.

The power train operates with such an intermittent drive film advancing mechanism in the following manner. During the time when the claw 3f advances the film by one frame between picture taking stops, the downward movement of the slide 3"a causes the gear 15 engaging the rack 3e of slide 3"a to rotate in the counter-clockwise direction by an angular distance dependent upon the length of one frame, and simultaneously the gear 16 to rotate in the clockwise direction, so that the motion of the gear 16 is transmitted through the friction clutch 17 to the ratchet wheel 18, thereby the ratchet wheel 18 is driven for rotation in a clockwise direction. As the ratchet wheel 18 is rotated in the clockwise direction, the rotary motion transmitting pin 4"a drives the take-up reel 4 of the film magazine 11', thereby the take-up reel 4 collects that portion of the film which is being advanced by the pull-down mechanism. During the time when the slide 3"a is moving upwardly, or when the claw 3f is not advancing the film, the upward movement of the slide 3"a causes the gear 15 engaging the rack 3e of slide 3"a to rotate in the clockwise direction by the angular distance, and simultaneously the gear 16 to rotate in the counter-clockwise direction. In this case, although the rotation force of the gear 16 is applied through the friction clutch 17 to the ratchet wheel 18 it is prevented from counter-clockwise rotation under the action of the spring pawl 19, and therefore, the take-up reel 4 is not driven by the pin 4″a.

It will be appreciated from the foregoing description that one embodiment of the film transport apparatus in accordance with the invention automatically arrests the take-up reel during the time when a film frame is held stationary behind the exposure aperture, in other words, when the intermittent-drive film advancing mechanism is not advancing the film, while permitting operation of the power train, to insure that the film in the film gate is not susceptible to residual intermittent and irregular motions which would be otherwise caused by the tension exerted on the advanced film. As a result, the retention force of the film gate to the film overcomes the force of the advanced film to stabilize the transport of the film past the film gate.

FIG. 6 shows another embodiment of a film transport apparatus in accordance with the present invention as incorporated in a motion picture camera. The camera comprises a housing not shown which accommodates a Super 8 film magazine having a take-up reel 4, an objective lens barrel 8, a disk-shaped shutter 23 arranged between the lens barrel 8 and a film gate not shown to intermittently expose the window 11′a of the magazine 11 in response to rotation of the shaft $3d_1$ thereof, and a gear train 26, 22 and 3d connecting a motor 20 with the shaft $3d_1$. The arrangement and construction of the parts 3d, 20, 21, 22 and 23 is identical to those mentioned in connection with FIG. 5. The film transport apparatus comprises a pull-down mechanism 3, a take-up reel drive mechanism including a rachet wheel 26, a motion transmitting mechanism including a flexible transducer 25 arranged to serve as a reciprocating rachet for the rachet wheel 26. The pull-down mechanism 3 is similar in construction to that of FIG. 5 except that the slide 3″a of FIG. 6 is not provided with the rack 3e and instead it fixedly carries one end 25a of the flexible transducer 25. The take-up reel drive mechanism comprises the ratchet wheel 26 fixedly mounted on a shaft 26a which is journaled in the camera housing and cooperating with reversal motion preventing pawl 30 to permit only the clockwise rotation of the ratchet wheel 26, and a disk 28 having a rotary motion transmitting pin 4″a arranged to engage the take-up reel of a magazine which is properly inserted in the magazine chamber. The disk 28 is coaxially and rotatably mounted on the shaft 26a to receive torque from the rachet wheel 26 through a single direction friction clutch 29 rotatably mounted on the shaft 26a as the ratchet wheel 26 is rotated by reciprocating movement of the free end 25b of the flexible transducer 25. The motion transmitting mechanism comprises the flexible transducer 25 passing through a channel 27a of a guide member 27 between the pull-down mechanism 3 and the drive mechanism 26 and fixedly mounted in the housing.

The operation of the film transport apparatus of FIG. 6 is as follows. When the pull-down mechanism 3 is driven by the motor 20, the slide 3″a operates in a manner similar to that described in connection with FIG. 5. During the time when the claw 3f advances the film, the downward movement of the slide 3″a causes the free end 25b of the flexible transducer 25 to extrude upward from the exit of the channel 27a, thereby the ratchet wheel 26 is rotated in a clockwise direction. As the ratchet wheel 26 is rotated, the disk 28 receives torque through the friction clutch 29. The motion of the disk 28 is transmitted to the take-up reel through the rotary motion transmitting pin 4″a, thereby that portion of the film which is advanced by the downward movement of claw 3f is wound up on the take-up reel 4. During the next time when the film is held stationary for exposure, or when the slide 3″a is moving upward, the free end 25b of the flexible transducer 25 is retracted and is brought into engagement with the next tooth of the ratchet wheel 26, while the ratchet wheel 26 is held against rotation under the action of the pawl 30.

As is understood from the above, the second embodiment of the film transport apparatus in accordance with the present invention also holds the take-up reel against rotation during the time when a film frame is held stationary behind the exposure aperture, in other words, when the intermittent-drive film advancing mechanism is not advancing the film, while permitting operation of the motor, to insure that the film in the film gate is not susceptible to residual intermittent and irregular motions which would be otherwise caused by the tension exerted on the advanced film. As a result, the retention force of the film gate to the film overcomes the force of the advanced film to stabilize the transport of the film past the film gate.

Figure 7:
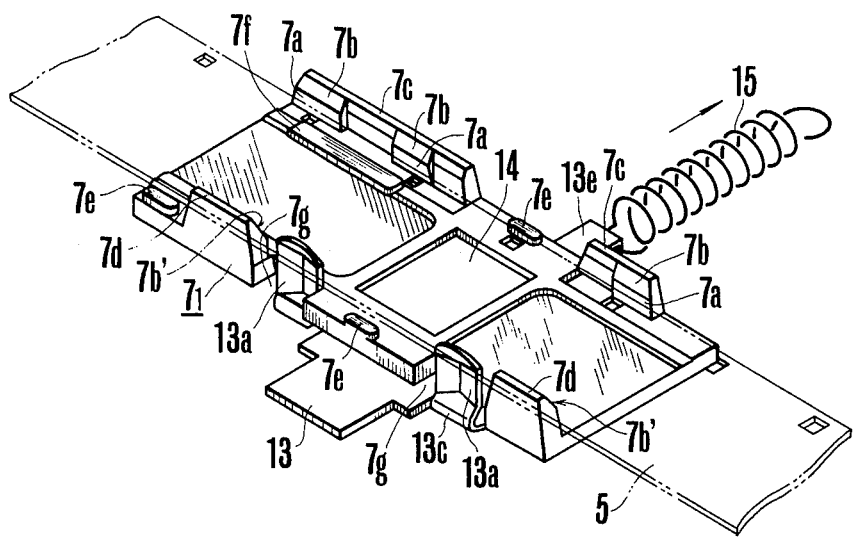
FIG. 7 is a perspective view of a film gate mechanism adapted for use in the camera of FIG. 5 or 6 and constructed in accordance with the present invention.
Figure 8:
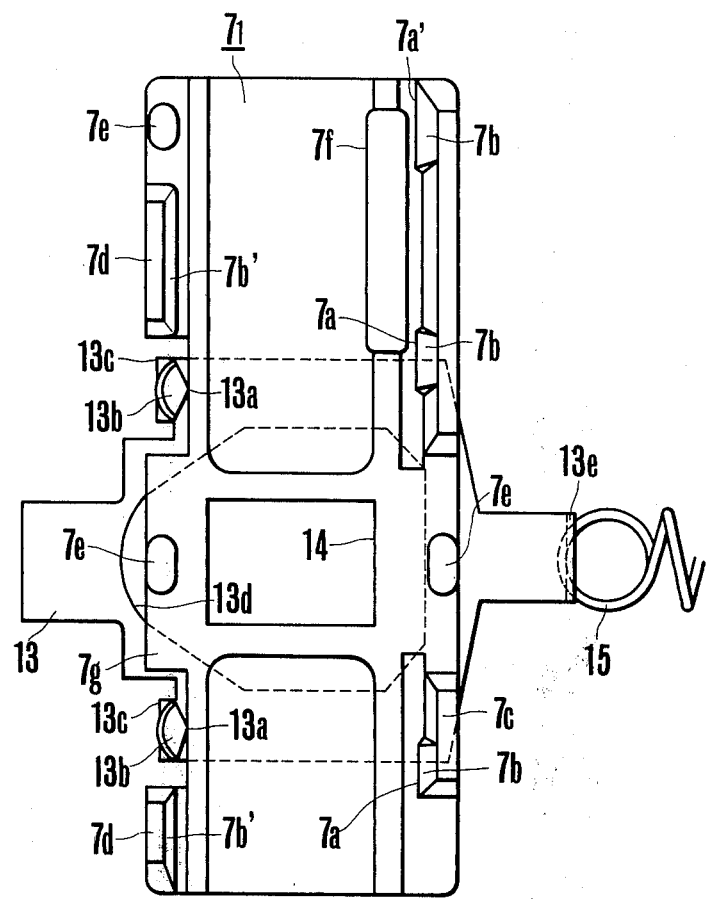
FIG. 8 is an elevational view of the film gate mechanism of FIG. 7.
Figure 9:
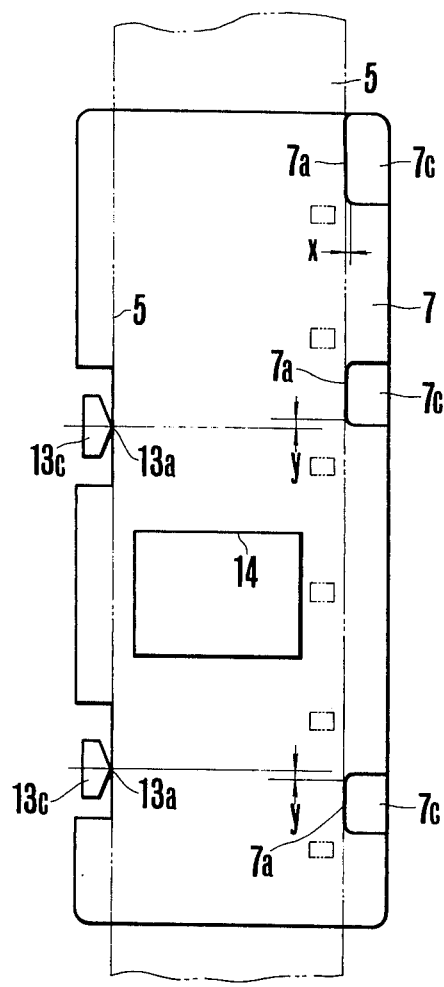
FIG. 9 is a schematic elevational view of the film gate mechanism of FIG. 7 helpful in understanding how to displace the parts of a film channel therein.

As shown in FIGS. 7, 8 and 9, still another embodiment of the present invention provides a film gate mechanism of novel structure adapted for association with the film transport apparatus of FIGS. 5 and 6. In FIG. 7, there is shown the film gate mechanism as comprising an aperture plate $7_1$ having a precise aperture 14 machined therethrough for a film frame being exposed, means for defining a film guide channel as passing behind the exposure aperture 14 and resilient means for exerting retention force to the film in the region of the film gate. The aperture plate $7_1$ is provided with a longitudinally elongated slot 7f machined therethrough adjacent the exposure aperture to permit the pull-down claw 3f to engage the perforation of the film 5 and to intermittently advance it through a film channel defined by the aperture plate $7_1$ and the pressing plate 9 (see FIGS. 1–4). Fixedly mounted on the right hand side of the film path is viewed in FIG. 7 are upper and lower film alignment abutments 7c spaced from each other by a distance slightly longer than the length of the exposure aperture 14 and from the exposure aperture in symmetrically spaced relation. Fixedly mounted on the left hand side of the film path are a pair of film guides in symmetrically spaced relation to the exposure aperture 14. The aperture plate $7_1$ is further provided with at least three protuberances 7e of a height slightly longer than the thickness of the film 5 distributed in the both sides of the film so that when the window 11′a of a film magazine 11 is engaged with the film gate $7_1$, a space is secured for the film channel as defined by the aperture plate $7_1$ and the pressing plate 9.

The resilient means comprises a pair of upstanding film abutment arms 13a extending from a slide plate 13 through cutouts 7g which are provided in the aperture plate $7_1$ in symmetrically spaced relation to the exposure aperture 14 on the left hand side of the film path between the film guides 7d, and which extend into the film path. The slide 13 is biassed by a helical spring 15 connected between a projection 13e of the slide plate 13 and the camera housing which tends for the arms 13a to urge the film against the film alignment abutments 7c. Each of the arms 13a has a bent portion 13c to impart some elasticity to the arm 13a. The spring 15 is selected so that the two arms 13a exert a friction to the film 5 to hold it against the film alignment abutments 7c with an appropriate force.

The film alignment abutments 7c each are configured to have at least one film abutment surface portion 7a which inclines inwardly at a slight angle with the inner surface of the other portion of the abutment 7c, and the surface portions 7a in the upper and lower abutments 7c are arranged as displaced by short distances in longitudinal directions with respect to the arms 13a. Each of the film alignment abutments 7c and each of the film guides 7d are provided with tapered portions 7b and 7b' respectively for facilitating insertion of the film toward the aperture plate $7_1$. The slide plate 13 is provided with an aperture 13d which is indicated by dash lines in FIG. 8, and which has an area larger than that of the exposure aperture in alignment therewith to entirely expose the exposure aperture 14 to light entering through the objective lens 8.

With the film gate mechanism of FIG. 7, the path of the film 5 is defined in the following manner. The film 5 is urged downwardly by a not shown pressing plate as viewed in FIG. 7, and is intermittently advanced by the pull-down claw 3f through a film guide channel defined by the aperture plate $7_1$ and the pressing plate which are spaced apart from each other by a distance equal to the height of the protuberance 7e. The left hand edge of the film 5 is slidably engaged with the arms 13a projecting inwardly of the inner surface of the film guides 7d to the film channel, while the right hand edge is slidably engaged with the film alignment abutment surface portion 7a projecting inwardly of the other surface portion of the film channel. At this time, these sliding contacts with the film abutments 7a and 13a exert friction force on the film to retain it in position. Because of offset arrangement of the sliding contacts from each other, the friction force is concentrated in several points distributed in the region of the film gate and is permitted to act in directions slightly inclined from the direction in which the film is advanced, thereby the film is subjected to torsion in addition to flexion owing to the flexibility of the film itself.

If the both edges of a film receive equally distributed forces to each other, the film tends to bend in the form of a mountain. But, by application of a force to the film in a manner to impart a torsion thereto, the tendency of bending in the form of a mountain is decreased with increase in tendency of approaching to the aperture plate $7_1$ with the help of the inwardly inclined surfaces 7a of the film alignment abutments 7c. In other words, when the film alignment abutment surface portions 7a and the resilient armrs 13a are arranged as offset in the longitudinal directions from each other by slight distances, the film is retained in position with a force of nature described above without suffering from the force of the advanced film. This offset spacing relation of the retention force exerting elements 7a and 13a will be better understood by reference to FIGS. 8 and 9.

In FIG. 9, the film 5 that is indicated by dot-and-dash lines is illustrated as held between the abutment surface portion 7a and the arms 13a which are displaced from each other by a distance, y. With this arrangement of the reaction force exerting elements 7a and 13a, it is possible to hold a film frame in a predetermined position against residual intermittent and irregular motions. From the point of view of manufacturing such a film gate with high precision, it is preferred that the film alignment abutments are configured to include film alignment abutment surface portions 7a of a relatively shorter length rather than configured in the form of projection 7a of the above-identified length. In latter connection, the molten material from which the film gate is to be made is more difficult to be set in the mold with sufficient accuracy. The longer the length of the film abutment surface 7a, the more effective the application of the retention force to the film. In order to assure that the lift time is sufficiently long, however, the length of the abutment surface is preferably in the order of 2mm. The amount of projection of the abutment surface 7a from the other surface portion 7c is preferably in the order of 0.1–0.4mm because of the forming operation. Further, it is preferred that the first abutment surface 7a counting from the entrance of the film channel in the film gate is displaced from the line along which the other abutment surfaces are arranged by a slight distance, x, of 0.04mm, for example. According to various film running experiments, the amount of displacement, y, between the abutment surface 7a and the arm 13a is preferably in the range of from 0.1mm to 1mm. So long as this condition is satisfied, the retention force of from 42g to 100g which is widely accepted in the art can be exerted to the film from one abutment point. Besides the employment of such film retention force exerting means, the aperture plate may be employed to exert an additional retension force to the film by making it from a material having a friction property identical to that of the material of the film 5. For example, the aperture plate $7_1$ and resilient means 13 may be made from plastic to increase the sliding friction.

It will be appreciated from the foregoing that the third embodiment of the invention comprises a film transport apparatus comprising a pull-down 3'a, 3"a whose claw 3f enters the perforation of the film 5 in a film magazine 11 through its window 11a, 11'a and intermittently advances it past an exposure aperture, and a film gate 7 having the exposure aperture and provided with means for exerting friction to that portion of the film 5 which passes the window 11a, 11'a with a force larger than the force of the advanced film to permit the sliding friction to act as the above mentioned retention force immediately after each intermittent-drive film advancing operation is terminated, thereby the film frame is held stationary in the position for a picture being taken with more safety than in the conventional film transport apparatus employing no film retention force exerting means of the invention despite of the fact that the film between the film gate and the take-up reel is tensioned to some extent.

The third embodiment of the invention is described as independent of the first and second embodiments, but may be considered as applicable to the film gate of the motion picture camera employing a film transport apparatus constructed as in the first or second embodiment of the present invention. The film gate is omitted in FIGS. 5 and 6 for the purpose of clarity only. Aside from its use in a motion picture camera, the film transport apparatus of the invention is applicable, with slight modification, to motion picture projections.

It will be seen from the foregoing description that a motion picture camera or a motion picture projector employing a film transport apparatus of the present invention operates with a film strip in such a way that during the time when the film frame is exposed or projected, the take-up drive means is arrested not to permit the take-up reel to pull the film, while during the time when the intermittent-drive film advancing means is advancing the film past the exposure aperture, the take-up reel is driven by the take-up reel drive means. Further, the film gate operates with the film strip in such a manner that a retention force larger than the force of the advanced film is applied to the film in the film gate, whereby the film in the film gate is stabilized against residual intermittent and irregular motions as it is intermittently advanced past the film gate to effect an improvement of the quality of reproduced images despite of the fact that vibrations or shocks sometimes develop in the region of the take-up reel.

What is claimed is:

1. Film transport apparatus for a motion picture camera, projector, and the like utilizing film housed in a magazine, comprising, in combination:
   a. an aperture plate;
   b. a film guide means to guide film to a prescribed position on said aperture plate;
   c. film binding means for stabilizing said film on said aperture plate;
   d. film feeding means for intermittently driving said film on said aperture plate overcoming the film binding force of said film binding means, said film feeding means including
      a film advancing member having a film advancing claw thereon and means mounting said film advancing member to enable said film advancing member to effect linear reciprocal movement along the running direction of the film and rotative reciprocal movements in directions perpendicular to said running direction so as to allow the film advancing claw to effect
         a first shifting movement in a direction generally perpendicular to the film running direction for engaging perforations in said film,
         a second shifting movement through a predetermined distance from said engaged position along the running direction of the film while engaged with the perforations of the film,
         a third shifting movement in a direction generally perpendicular to the running direction of film away from the film for disengaging said claw from the film perforations, and
         a fourth shifting movement to the position where said first shifting movement is started from the position at which said third shifting movement is completed with said claw disengaged from the film perforations;
      a driving motor;
      a driving power transmission control means mechanically linked with said driving motor and with said film advancing member for transmitting the output of said driving motor to the film advancing member for controlling shifting of the film advancing member;
   e. film take-up means for winding film which has run past said aperture plate at a predetermined position including
      a film take-up reel driving member to provide film take-up action,
      a first rotating member for rotating said film take-up reel driving member in a forward direction through a rotating locus, said film take-up reel driving member being provided as a part of said first rotating member,
      a second rotating member rotatable in a forward or reverse direction in accordance with rotating force delivered thereto, and
      one-way clutch means engaged between said first and second rotating members for imparting to said first rotating member forward rotating force from said second rotating member but to prevent driving engagement therebetween during reverse rotation of said second driving member;
   f. actuating means for driving said film take-up means including
      shifting means for effecting reciprocal movement in a linear path in collabration with the linear reciprocal movement along the running direction of the film by said film advancing member, said shifting means being provided on said film advancing member, and
      movement conversion means for converting linear movement of said shifting means to repeated rotating movement and to transmit said movement to said second rotating member, said conversion means being mechanically linked with said shifting means and said second rotating member, said second rotating member being rotated in a forward direction by movement of said shifting means as said film advancing member is shifted to effect said second shfting movement of said film advancing claw while said second rotating member is rotated in a reverse direction by movement of said shifting means as said film advancing member is shifted to effect said fourth shifting movement of said film advancing claw;
   said film take-up means being activated only when film is running on said aperture plate, with said film being bound on said aperture plate when said film is not running thereby stabilizing the film on said aperture plate.

2. Apparatus according to claim 1, wherein said film guide means includes means defining a film running passage and a plurality of film guide elements positioned linearly along one end of said running passage protruding beyond said aperture plate forwardly and rearwardly of the aperture of said aperture plate to have said aperture positioned therebetween.

3. Apparatus according to claim 2, wherein said binding means comprise a plurality of film abutment elements placed at linear positions along the side of said film running passage opposite the side thereof at which said film guide elements are placed, said abutment elements being located both forwardly and rearwardly of the aperture of the aperture plate and slightly shifted from a point directly opposite said film guide elements, and biassing means biassing said film abutment elements in a direction toward said film running passage.

4. Apparatus according to claim 1, wherein said second rotating member and said movement conversion means comprise gears engaging each other, and wherein said shifting means include a rack engaged with the gear of said movement conversion means.

5. Film transport apparatus for a motion picture camera, projector and the like utilizing film housed in a magazine, comprising, in combination:
   a. an aperture plate;
   b. a film guide means for guiding film at a prescribed position on said aperture plate,
   c. a film binding means for guiding film at a prescribed position on said aperture plate, d. film feeding means overcoming the film binding force of the film binding means for intermittently driving the film on said aperture plate, said film feeding means including
a film advancing member having a film advancing claw thereon and means mounting said film advancing member to effect linear reciprocal movement thereof along the film running direction and rotative reciprocal movements in directions generally perpendicular to said running direction in order to effect in said film advancing claw
a first shifting movement in a direction generally perpendicular to said film running direction toward said film for engaging the perforations in said film,
a second shifting movement in a predetermined running direction of the film through a prescribed distance while engaging the perforations of the film to run said film through said prescribed distance travelled thereby,
a third shifting movement in a direction generally perpendicular to said film running direction away from said film disengaging itself from the perforations of the film, and
a fourth shifting movement from the position at which said third shifting is completed directly to a position at which said first shifting is started while disengaged from said film perforations;
a driving motor;
a driving power transmission control means mechanically linked with said driving motor and with said film advancing member to transmit the output of said driving motor to said film advancing member for controlling shifting of the film advancing member;
e. film take-up means for winding film which has run past said aperture plate to a predetermined position including
a film take-up reel driving member to provide film take-up action, and
rotating means to rotate said film take-up reel driving motor within a rotation locus, said film take-up reel driving member being provided at a part of said rotating means; and
f. actuating means to rotate said rotating means, one end of said actuating means being fixedly provided on the film advancing member to effect reciprocal sliding in collaboration with the linear reciprocal movement against the running direction of the film made by the film advancing member, while the other end is free and is placed at a position engageable with the rotating means;
said free end of the actuating means and the rotating means being engaged and said free end of the actuating means rotating the rotating means to a degree commensurate with the shifting of said film advancing member when said film advancing member is shifted to effect said second shifting movement of said film advancing claw, with engagement between the free end of the actuating means and the rotating means being released to actuate the film take-up means in collaboration with film running on the aperture plate when said film advancing member is shifted to effect said fourth shifting movement of said film advancing claw, the film being bound on the aperture plate when the film is not run to stabilize the film on the aperture plate.

6. Apparatus according to claim 5, wherein the film guide means includes means defining a film running passage and at least a plurality of film guide elements so positioned linearly along one end of said running passage of the film to protrude beyond the aperture plate in front and in the rear of the aperture of the aperture plate on said aperture plate thereby sandwiching said aperture.

7. Apparatus according to claim 6, wherein said binding means include at least a plurality of film abutment elements placed at linear positions along the end of the film running opposite to the one end thereof at which said film guide element is positioned, and at a position in front and in the rear of the aperture of the aperture plate sandwiching side aperture and slightly away from a position opposite said film guide element sandwiching said running passage, with biasing means being provided to always bias said film abutment elements to a direction within said film running passage.

8. Apparatus according to claim 5, wherein said rotating means includes a ratchet wheel.

9. Film transport apparatus for a motion picture camera, projector, and the like utilizing film housed in a magazine, comprising, in combination:
a. film guide means including
a film guide plate defining a running passage for the film and having a planar part defining therethrough an exposure aperture, said plate being formed with at least a plurality of film guide elements linearly arranged along one end of the film running passage and in front and in the rear of the exposure aperture sandwiching the exposure apparatus therebetween and protruding beyond said planar part,
binding means to stabilize the film on the film guide plate including
a plurality of film abutment elements positioned linearly along the other end of the film running passage opposite to the one end thereof at which the film guide elements of the film guide plate are placed, in front and in the rear of the exposure aperture sandwiching said exposure aperture therebetween and also sandwiching the film running passage, at a position slightly shifted from a point opposite the film guide elements, for sandwiching both edges of the film together with the film guide elements of the film guide plate, said abutment elements being adapted to be shifted in directions traversing the film running passage, and
biassing means to continuously bias said film abutment elements to a direction within the film running passage;
b. a driving motor;
c. film feeding means to overcome the film binding force of the binding means and to intermittently run the film on the film guide plate, said feeding means including
a film advancing member which has at one part a film advancing claw and means mounting said film advancing member for linear reciprocal movement along the film running direction and for reciprocal rotary motion in directions generally perpendicular to said running direction so that said film advancing claw can effect a first shifting movement in a direction generally perpendicular to the film running direction toward the film for engaging perforations of the film, a second shifting movement in the running direction of the film through a prescribed distance from said engaged position while being engaged with said film perforation for running the film through said prescribed distance travelled thereby, a third shifting movement in a direction generally perpendicular to the film running direction away from the film for disengaging from the film perforation, and a fourth shifting movement from the position at which said third shifting movement is completed directly to a position at which said first shifting movement is started without going through said third and second shifting movements, and driving motor transmission control means mechanically linked with said driving motor and the film advancing member to transmit the output of said driving motor to the film advancing member for controlling movement of the film advancing member;

d. film take-up means for consecutively taking up the film which has run on said film guide plate at a predetermined position;

c. actuating means to perform said take-up action of the film take-up means including shifting means to effect linear reciprocal movement in collaboration with the linear reciprocal movement of the film advancing member along the film running direction, said shifting means being provided on the film advancing member, and one-way clutch means for driving power transmission, to transmit the shifting power of said shifting means to the film take-up means for causing the film take-up means to effect said film take-up action when the film advancing member is so moved linearly along the film running direction as to allow the film advancing claw to effect said second shifting movement, and at the same time absorb the shifting power of the shifting means so that said power will not operate on the film take-up means preventing said action of the film take-up means when the film advancing member is moved linearly along the film running direction to a direction allowing the said fourth shifting movement of the film advancing claw, said clutch means being mechanically linked with the shifting means and the film take-up means, said film take-up means being allowed to take up the film which has run on said film guide plate only when the film is being run by the film advancing member on the film guide plate, while said film take-up action of the film take-up means is prevented and the film is bound on the film guide means to stabilize the film on the film guide means when the film is not being run.

* * * * *